(12) United States Patent
Cline

(10) Patent No.: US 12,493,884 B2
(45) Date of Patent: Dec. 9, 2025

(54) SYSTEMS AND METHODS FOR PREDICTING ILLEGITIMATE ACTIVITY BASED ON USER MARKER LEVELS

(71) Applicant: Capital One Services, LLC, McLean, VA (US)

(72) Inventor: Vishi Cline, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 53 days.

(21) Appl. No.: 18/342,631

(22) Filed: Jun. 27, 2023

(65) Prior Publication Data

US 2025/0005579 A1   Jan. 2, 2025

(51) Int. Cl.
  *G06Q 20/40*  (2012.01)

(52) U.S. Cl.
  CPC .................. *G06Q 20/4016* (2013.01)

(58) Field of Classification Search
  None
  See application file for complete search history.

(56) References Cited

U.S. PATENT DOCUMENTS

| | | | |
|---|---|---|---|
| 10,810,510 | B2 | 10/2020 | Baracaldo Angel et al. |
| 11,610,205 | B1* | 3/2023 | Fain ................... G06Q 20/1085 |
| 2020/0162509 | A1 | 5/2020 | Ballot |

OTHER PUBLICATIONS

Prajokta Ray et al., "Label-Free Optical Detection of Multiple Biomarkers in Sweat, Plasma, Urine, and Saliva", ACS Sensors, 2019, 4, pp. 1346-1357, DOI: 10.1021/acssensors.9b00301.
Rebeca M. Torrente-Rodriguez et al., "Investigation of Cortisol Dynamics in Human Sweat Using a Graphene-Based Wireless mHealth System", Matter 2, Apr. 1, 2020, pp. 921-937, DOI: 10.1016/j.matt.2020.01.021.
California Institute of Technology. "Sweat sensor detects stress levels; May find use in space exploration." ScienceDaily, Feb. 26, 2020. <www.sciencedaily.com/releases/2020/02/200226134124.htm>.
Yu Lei et al. "Single-atom doping of MoS2 with manganese enables ultrasensitive detection of dopamine: Experimental and computational approach." ScienceAdvances, Aug. 7, 2020. https://www.science.org/doi/10.1126/sciadv.abc4250.
Itay Algov et al. "Sensitive enzymatic determination of neurotransmitters in artificial sweat." Biosensors and Bioelectronics, vol. 210, Aug. 15, 2022, 114264. https://doi.org/10.1016/j.bios.2022.114264.

* cited by examiner

*Primary Examiner* — Scott S Trotter
*Assistant Examiner* — Amit Patel
(74) *Attorney, Agent, or Firm* — Bookoff McAndrews, PLLC

(57) ABSTRACT

Systems and methods for predicting illegitimate activity based on detecting user marker levels include determining a presence of a user sample at a user services system, the user services system including one or more marker sensors, collecting, via the one or more marker sensors, sensor device data, the sensor device data including user marker levels from the user sample, analyzing, via one or more processors, the user marker levels compared to a marker range, and upon determining the user marker levels exceed the marker range, generating an illegitimate activity alert.

20 Claims, 5 Drawing Sheets

SYSTEMS AND METHODS FOR PREDICTING ILLEGITIMATE ACTIVITY BASED ON USER MARKER LEVELS

TECHNICAL FIELD

Various embodiments of this disclosure relate generally to predicting illegitimate activity and, more particularly, to systems and methods for analyzing a user sample to analyze one or more biological marker levels with reference to a marker range.

BACKGROUND

Conventionally, methods for determining and/or dealing with illegitimate activity operate after-the-fact, e.g., after the illegitimate activity has concluded. For example, account holders may notice irregular charges, withdrawals, and/or transfers associated with their account and dispute the transactions. In these cases, the account holder—and often the financial institution hosting the account—must suffer the consequences of the illegitimate activity, including but not limited to monetary loss, tarnished reputation, stress, etc. Conventional techniques for after-the-fact management of illegitimate activity often causes losses for both financial institutions and account holders, while enabling illegitimate users to obtain funds illegitimately.

This disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for predicting illegitimate activity based on detecting user marker levels.

In one aspect, a method for predicting illegitimate activity based on detecting user marker levels is disclosed. The method may include determining a presence of a user sample at a user services system, the user services system including one or more marker sensors; collecting, via the one or more marker sensors, sensor device data, the sensor device data including user marker levels from the user sample; analyzing, via one or more processors, the user marker levels compared to a marker range; and upon determining the user marker levels exceed the marker range, generating an illegitimate activity alert.

In another aspect, a method for predicting illegitimate activity based on detecting user marker levels is disclosed. The method may include receiving a user request at a user services system, the user request including a request for account activity; determining a presence of a user sample at one or more marker sensors of the user services system; automatically collecting, via the one or more marker sensors, sensor device data, the sensor device data including user marker levels from the user sample; determining, via a trained machine learning model, whether the user marker levels exceed an account holder-specific marker range, wherein the account holder-specific marker range is generated based on account holder-specific data collected from one or more accounts, the trained machine learning model trained to predict illegitimate activity based on the collected user marker levels present in the user sample; upon determining the user marker levels exceed the account holder-specific marker range, generating an illegitimate activity alert and rejecting the user request based on the exceeded account holder-specific marker range; and causing to output, via a user interface, a notification of the rejection of the user request.

In another aspect, a system is disclosed. The system may include at least one memory storing instructions; and at least one processor executing the instructions to perform operations for predicting illegitimate activity based on detecting user marker levels, the operations including: determining a presence of a user sample at a user services system, the user services system including one or more marker sensors; collecting, via the one or more marker sensors, sensor device data, the sensor device data including user marker levels from the user sample; analyzing, via one or more processors, the user marker levels, the user marker levels compared to a marker range; and upon determining the user marker levels exceed the marker range, generating an illegitimate activity alert.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
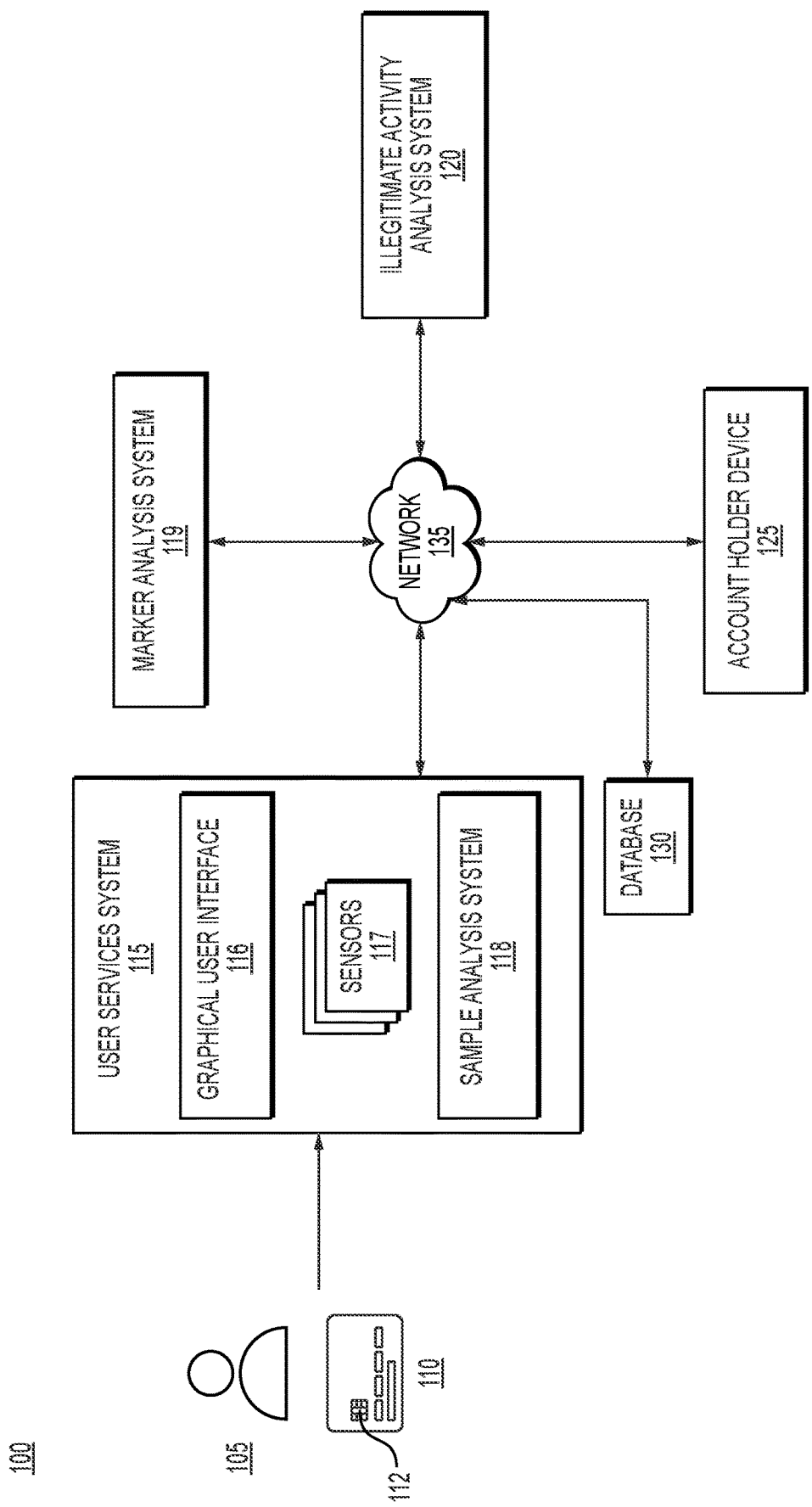
FIG. 1 depicts an exemplary system for predicting illegitimate activity based on detecting user marker levels, according to one or more embodiments.

Reference to any particular activity is provided in this disclosure only for convenience and not intended to limit the disclosure. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistic regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

The term "user" or the like may refer to a person using a card, attempting to access an account, etc. The user may be an illegitimate user. For example, a user may be an individual who illegitimately obtained a bank card and may be attempting to use the card to access a bank account. The term "account holder" or the like may refer to the rightful owner of an account. For example, a user may attempt to illegitimately access an account holder's account.

According to an example of the disclosed subject matter, an account holder may experience illegitimate, e.g., fraudulent, activity related to an account, e.g., a financial and/or bank account. The illegitimate activity may be detected only after an illicit transaction has occurred, leaving few options for either the account holder experiencing the illegitimate activity and/or a financial institution to seek recourse. Conventionally, upon detection of the illegitimate activity, the account holder may have to request recompense, e.g., from the financial institution. Further, the account holder's account and/or transaction card associated with the account may be disabled for a period of time, which may interfere with the account holder's day-to-day life and expenses. Thus, it may be desirable to improve detection of illegitimate activity, e.g., by detecting catecholamines in a user's sweat.

In an exemplary use case, a user may attempt to access an account, e.g., a financial and/or bank account, via a user services system, e.g., an Automated Teller Machine (ATM). For example, a user may request a withdrawal at an ATM. While using the ATM, one or more sensors, e.g., residue sensors, may collect and/or analyze samples from the user, e.g., of the user's sweat, oil, etc. The one or more sensors may be incorporated into one or more aspects of the ATM, e.g., in a keyboard, in a touch screen, within the card slot, etc. For example, if the user touches the keyboard or touch screen, the sensors may collect the sample from the user's fingers. In another example, the user may insert the transaction card into the ATM card slot. The transaction card may have on and/or within it a sample—which may have been previously collected from the user—that one or more sensors in the card slot may be able to collect from the card.

The collected samples may be analyzed to determine the levels of one or more biological markers, e.g., neurotransmitters, hormones, neurohormones, etc. For example, a sweat sample may be analyzed for levels of one or more catecholamines. Catecholamines (e.g., epinephrine (also known as "adrenaline"), norepinephrine (also known as "noradrenaline"), and dopamine) are monoamine neurotransmitters that can have variable physiological effects, including, for example, the "fight-or-flight" response. The fight-or-flight response is a physiological reaction to committing or experiencing perceived danger, threats, or other harmful events. For example, a person committing credit card fraud may experience the fight-or-flight response because they perceive their actions as dangerous, e.g., in that they may be incarcerated for the act. The fight-or-flight response causes an increased production and distribution of catecholamines in the body, and the increased catecholamine levels are detectable in various bodily secretions, e.g., saliva, sweat, mucous, etc., during and after the fight-or-flight response.

Biological marker levels naturally vary in an individual due to homeostatic processes. Therefore, biological marker levels, e.g., catecholamine levels, may be compared to a range, rather than a single value. The catecholamine levels, e.g., in a sweat sample, may be compared to a pre-determined range, e.g., a standardized range, a regional range, a user-specific range, etc., to determine whether a detected catecholamine level may be normal, abnormal, inconclusive, etc. The analysis may be conducted by a machine learning model trained to predict illegitimate activity based at least on the detected marker level in comparison to a user-specific marker range. If the catecholamine levels detected exceed the pre-determined range, an illegitimate activity alert may be generated and/or the user's request at the ATM may be rejected. If the catecholamine levels detected fall below the pre-determined range, a request for the user to provide another sample may be generated and/or cause to be displayed, e.g., via a graphical user interface (GUI).

The illegitimate activity alert may be received, e.g., by a third-party system, for further analysis in combination with one or more illegitimate activity indicators. For example, if a given account is already suspected of being targeted for illegitimate activity and an illegitimate activity alert is received, an overall illegitimate activity level may be determined based on both factors. The overall illegitimate activity level may be output to one or more systems, e.g., displayed via the GUI, transmitted to an internal fraud division of the financial institution, etc. Based on the illegitimate activity alert, the one or more illegitimate activity indicators, and/or the overall illegitimate activity level, the account targeted for illegitimate activity may be disabled, closed, paused, etc.

While several of the examples above involve detecting catecholamines in a user's sweat at an ATM, it should be understood that the styles and techniques according to this disclosure may be adapted to detecting any suitable type of biological marker, at any suitable type of device, e.g., a card reader, a cash register, etc. It should also be understood that the examples herein are illustrative only. The techniques and technologies of this disclosure may be adapted to any suitable configuration or activity.

FIG. 1 depicts an exemplary environment 100 for predicting illegitimate activity based on detecting user marker levels, according to one or more embodiments. Environment 100 of FIG. 1 depicts a user 105, a transaction card 110, a user services system 115, a marker analysis system 119, an illegitimate activity analysis system (hereinafter "IAA system") 120, an account holder (AH) device 125, a database 130, and a network 135.

User 105 may use transaction card 110 at user services system 115, e.g., as proof of identity, to access one or more user accounts, etc. Transaction card 110 may be any suitable card, such as a bank card (e.g., a credit card, a debit card, etc.), an identification card, a gift card, etc. Transaction card 110 may include one or more reservoirs 112. The one or more reservoirs 112 may be configured to hold, collect, contain, store, etc. a sample, e.g., from user 105. The sample may include residue from a user's hand, e.g., one or more of sweat, oil, etc. For example, the one or more reservoirs 112 may be configured to store a sweat sample from user 105. The sample stored by the one or more reservoirs 112 may be collected passively from user 105, e.g., by user 105 running a finger over the one or more reservoirs 112. Such collection may be conducted by mere contact with transaction card 110 (e.g., contact with one or more reservoirs 112), with or without awareness of the user 105. The sample may be provided to user services system 115, as further described below.

User services system 115 may be a device or system configured to obtain and/or analyze a user sample. User services system 115 may be any device, e.g., an ATM, a card reader, a cash register, etc. User services system 115 may be configured to receive one or more user samples (e.g., from user 105 directly, from transaction card 110, etc.) and/or data from one or more aspects of environment 100, e.g., from user 105 (e.g., via a GUI 116, discussed below), marker analysis system 119, IAA system 120, AH device 125, database 130, etc. For example, user services system 115 may be configured to obtain sensor location data, account data, and/or an illegitimate activity indicator. Sensor data may include the location of the sensor on an ATM, e.g., the card slot, the keypad, the GUI, etc., the location of the ATM, e.g., city, state, region, etc., other locations, etc. Account data may include data associated with an account, e.g., account balance, available credit, linked accounts, medical records (e.g., medications, diagnoses, etc.), etc. Medical records may be voluntarily provided by the account holder to provide relevant data for determining an account-holder specific marker range, such as in the case of the account holder having a catecholamine-based disease. The illegitimate activity indicator may include data of historical illegitimate activity (e.g., prior data breaches, prior lost or stolen transaction cards associated with the account, etc.) associated with one or both of transaction card 110 and/or an account. User services system 115 may be configured to transmit data to one or more aspects of environment 100, e.g., user 105 (e.g., via GUI 116), marker analysis system 119, IAA system 120, AH device 125, database 130, etc.

User services system 115 may include a GUI 116. User 105 may interact with user services system 115 via GUI 116, e.g., to interact with one or more bank accounts hosted by a server. GUI 116 may be configured display and/or to cause to display data, e.g., account data, one or more statuses of a user request, an illegitimate activity alert, etc.

User services system 115 may include one or more sensors 117 (e.g., one or more marker sensors). The one or more sensors 117 may be any suitable composition, such as non-invasive biosensors (e.g., sensors based on Manganese-Molybdenum Disulfide (MoS2), Copper Efflux Oxidase (CueO), etc.). The one or more sensors 117 may be configured to collect sensor device data, e.g., user sample composition, from a user sample, such as whether the user sample contains one or more of neurotransmitters, hormones, neurohormones, etc. One or more marker levels (e.g., levels of one or more of the neurotransmitters, hormones, neurohormones, etc. that are present in the sample) may be determined from the sensor device data, as discussed in more detail below. The one or more sensors 117 may be included in one or more aspects of user services system 115, such as in GUI 116, a card reader (e.g., a card slot, a Near Field Communication (NFC) receiver, a radio-frequency identification (RFID) receiver, a Europay, MasterCard, Visa (EMV) receiver, etc.), a biometric collection point (e.g., a fingerprint scanner, etc.), a keypad, one or more actuators (e.g., buttons), etc.

The one or more sensors 117 may be configured such that the one or more user samples are obtained passively from user 105 by mere contact with the one or more sensors 117, with or without awareness of the user 105. For example, the one or more user samples may be collected when user 105 presses a button on a keypad associated with user services system 115. Residue, e.g., from the finger of user 105, may be left on the keypad, and the one or more sensors 117 associated with the keypad may be configured to uptake, scan, analyze, etc. the sample.

In another example, the one or more user samples may be collected when transaction card 110 interacts with a card reader associated with user services system 115. As discussed above, transaction card 110 may retain a sample from user 105, e.g., by user 105 unconsciously running a finger over the one or more reservoirs 112. When transaction card 110 then interacts with the card reader associated with user services system 115, the sample may be deposited, obtained, left, etc. in, on, or around the one or more sensors 117. For example, when the transaction card 110 is inserted into a card slot associated with user services system 115, the sample retained by the one or more reservoirs 112 may be left as residue in, on, and/or around the one or more sensors 117 associated with the card slot.

User services system 115 may include a sample analysis system 118. Sample analysis system 118 may be configured to analyze the one or more user samples, e.g., to determine the composition of the one or more user samples. For example, sample analysis system 118 may be configured to determine a concentration of catecholamines (e.g., a catecholamine level) (hereinafter "user marker levels"), in the one or more user samples. Sample analysis system 118 may be configured to receive data from one or more aspects of environment 100, e.g., the one or more sensors 117, marker analysis system 119, IAA system 120, AH device 125, database 130, etc. Sample analysis system 118 may be configured to transmit data, e.g., the determined concentration of catecholamines to one or more aspects of environment 100, e.g., the one or more sensors 117, marker analysis system 119, IAA system 120, AH device 125, database 130, etc.

Marker analysis system 119 may be configured to analyze a user sample and/or user marker levels, e.g., to determine a likelihood of illegitimate activity. Marker analysis system 119 may be configured to generate an illegitimate activity alert, e.g., a prediction of illegitimate activity based on the user marker levels determined from the user sample. Marker analysis system 119 may be configured to obtain data from one or more aspects of environment 100, e.g., user services system 115, sensors 117, sample analysis system 118, IAA system 120, AH device 125, database 130, etc. Marker analysis system 119 may be configured to transmit data to one or more aspects of environment 100, e.g., user services system 115, sensors 117, sample analysis system 118, IAA system 120, AH device 125, database 130, etc.

In some techniques, marker analysis system 119 may be configured to predict a likelihood of illegitimate activity based on the user marker levels determined from the user sample using one or more trained machine learning models. As discussed in further detail below, the marker analysis system 119 may perform one or more of: generate, store, train, or use a machine learning model configured to predict a likelihood of illegitimate activity based on the user marker levels determined from the user sample. Marker analysis system 119 may include a machine learning model and/or instructions associated with the machine learning model, e.g., instructions for generating a machine learning model, training the machine learning model, using the machine learning model etc. Marker analysis system 119 may include instructions for retrieving illegitimate activity data, adjusting illegitimate activity data, e.g., based on the output of the machine learning model, and/or operating a display, e.g., GUI 116, to output illegitimate activity data, e.g., as adjusted based on the machine learning model. Marker analysis system 119 may include training data, e.g., user marker data, illegitimate activity data, etc., and may include ground truth, e.g., user marker data, illegitimate activity data, etc.

In some embodiments, a system or device other than marker analysis system 119 is used to generate and/or train the machine learning model. For example, such a system may include instructions for generating the machine learning model, the training data and ground truth, and/or instructions for training the machine learning model. A resulting trained machine learning model may then be provided to marker analysis system 119.

Generally, a machine learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine learning model, e.g., compare the output of the trained model with the ground truth for that portion of the training data to evaluate an accuracy of the trained model. The training of the machine learning model may be configured to cause the machine learning model to learn associations between training data and ground truth data, such that the trained machine learning model may be configured to determine an output illegitimate activity alert in response to the input user marker data based on the learned associations.

In some instances, different samples of training data and/or input data may not be independent. Thus, in some embodiments, the machine learning model may be configured to account for and/or determine relationships between multiple samples. For example, in some embodiments, the machine-learning model of marker analysis system 119 may include a Recurrent Neural Network ("RNN"). Generally, RNNs are a class of feed-forward neural networks that may be well adapted to processing a sequence of inputs. In some embodiments, the machine learning model may include a Long Short-Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of user marker levels as input, and generate an illegitimate activity prediction as output.

In some techniques, marker analysis system 119 may be configured to determine one or more conclusions, e.g., one or more risk factors, based on the user sample. In some techniques, if marker analysis system 119 predicts that the user sample is not indicative of illegitimate activity, one or more risk factors associated with the determined marker level(s) may be determined based on one or more of risk factor data, the user sample, etc. The one or more risk factors may include a risk of depression, a risk of disease relapse, a risk of disease progression, etc. Risk factor data may include relevant account holder medical data, such as diagnosis data, medication data, testing data (e.g., genetic, blood, imaging, etc. test results), etc. For example, for an account holder known to have Parkinson's disease, a non-illegitimate but high dopamine marker level may be indicative of a worsening of the disease. Marker analysis system 119 may be configured to output the one or more conclusions to other aspects of environment 100, e.g., AH device 125. The determined marker level(s) may be determined using techniques described herein.

In some techniques, marker analysis system 119 may be configured to determine the one or more risk factors using a trained machine learning model, e.g., a trained risk factor machine learning model. The trained risk factor machine learning model may be configured to predict the one or more risk factors based on at least the risk factor data and one or more user samples. The trained risk factor machine learning model may be trained and/or used via one or more of the methods described herein. Risk factor data may be used to establish a baseline for user 105, e.g., a baseline user marker level, and to adjust the marker range accordingly during training.

In some techniques, marker analysis system 119 may be configured to determine one or more trends based on the one or more risk factors, the user sample, etc. For example, marker analysis system 119 may determine that the average catecholamine levels in the user sample have been trending down in a user with diagnosed Parkinson's disease, which may indicate an improvement in the disease, a successful medical treatment, etc.

Marker analysis system 119 may be configured to obtain risk factor data from any suitable aspect of environment 100, e.g., user services system 115, IAA system 120, AH device 125, database 130, etc., and/or from one or more third parties, e.g., health care management system(s), system(s) of independent medical institute(s), etc. User 105 may have provided prior approval for risk factor data to be provided by the one or more sources to marker analysis system 119, such as through an agreement, a disclaimer, etc. Marker analysis system 119 may be configured to transmit risk factor data, the one or more risk factors, one or more trends, etc. to any suitable aspect of environment 100, e.g., user services system 115, IAA system 120, AH device 125, database 130, etc., and/or to one or more third parties, e.g., health care management system(s), system(s) of independent medical institute(s), etc.

IAA system 120 may be configured to determine an overall illegitimate activity level, e.g., based on one or more of the one or more user samples, the user marker levels, the illegitimate activity alert, and/or other data, e.g., one or more illegitimate activity indicators. Illegitimate activity indicators may be one or more indicators of illegitimate activity associated with an account, e.g., historical illegitimate activity reports associated with an account, reported theft of the transaction card associated with an account, historical illegitimate activity flags, holds, indicators, etc. associated with an account, etc. IAA system 120 may be configured to receive data from one or more aspects of environment 100, e.g., from user services system 115, the one or more sensors 117, sample analysis system 118, marker analysis system 119, AH device 125, database 130, etc. The data received by IAA system 120 may include data from user services system 115 (e.g., the one or more user samples, the user marker levels, transaction metadata, etc.), data from marker analysis system 119 (e.g., the illegitimate activity alert, etc.), account data (e.g., transaction history, etc.), the one or more illegitimate activity indicators, etc. IAA system 120 may be configured to transmit data, e.g., the overall illegitimate activity level, to one or more aspects of environment 100, e.g., to user services system 115, the one or more sensors 117, sample analysis system 118, marker analysis system 119, AH device 125, database 130, etc.

In some techniques, IAA system 120 may be configured to determine the overall illegitimate activity level using a trained machine learning model, e.g., a trained overall illegitimate activity machine learning model. The trained overall illegitimate activity machine learning model may be configured to predict the overall illegitimate activity level based on one or more of the one or more user samples, the user marker levels, the illegitimate activity alert, and/or the one or more illegitimate activity indicators. The trained overall illegitimate activity machine learning model may be trained and/or used via one or more of the methods described herein.

AH device 125 may be a device owned and/or operated by an account holder. AH device 125 may be configured to receive information about a user account, e.g., the illegitimate activity alert, the overall illegitimate activity level, etc. AH device 125 may be configured to output and/or to cause to output data, e.g., the illegitimate activity alert, the overall illegitimate activity level, etc. AH device 125 may be configured to output and/or to cause to output data (e.g., the illegitimate activity alert, the overall illegitimate activity level, etc.) via a GUI associated with AH device 125. AH device 125 may be configured to receive data from one or more aspects of environment 100, e.g., from user services system 115, the one or more sensors 117, sample analysis system 118, marker analysis system 119, IAA system 120, database 130, etc. AH device 125 may be configured to transmit data to one or more aspects of environment 100, e.g., to user services system 115, the one or more sensors 117, sample analysis system 118, marker analysis system 119, IAA system 120, database 130, etc.

Database 130 may be configured to store sensor device data, marker levels, marker ranges, etc. For example, database 130 may store one or more marker levels collected over time.

One or more of the components in FIG. 1 may communicate with each other and/or other systems, e.g., across network 135. In some embodiments, network 135 may connect one or more components of environment 100 via a wired connection, e.g., a USB connection between user services system 115 and database 130. In some embodiments, network 135 may connect one or more aspects of environment 100 via an electronic network connection, for example a wide area network (WAN), a local area network (LAN), personal area network (PAN), or the like. In some embodiments, the electronic network connection includes the internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network may obtain information from any other computer and communicate with parties of other computers or devices. The most widely used part of the Internet is the World Wide Web (often-abbreviated "WWW" or called "the Web"). A "website page," a "portal," or the like generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like. In any case, the connections within the environment 100 may be network, wired, any other suitable connection, or any combination thereof.

Although depicted as separate components in FIG. 1, it should be understood that a component or portion of a component in the environment 100 may, in some embodiments, be integrated with or incorporated into one or more other components. For example, sample analysis system 118 may be integrated into marker analysis system 119 or the like. In another example, marker analysis system 119 may be integrated into user services system 115 or the like. In some embodiments, operations or aspects of one or more of the components discussed above may be distributed amongst one or more other components. Any suitable arrangement and/or integration of the various systems and devices of the environment 100 may be used.

Further aspects of the machine learning model and/or how it may be utilized to predict illegitimate activity are discussed in further detail in the methods below. In the following methods, various acts may be described as performed or executed by a component from FIG. 1, such as marker analysis system 119, IAA system 120, or components thereof. However, it should be understood that in various embodiments, various components of the environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
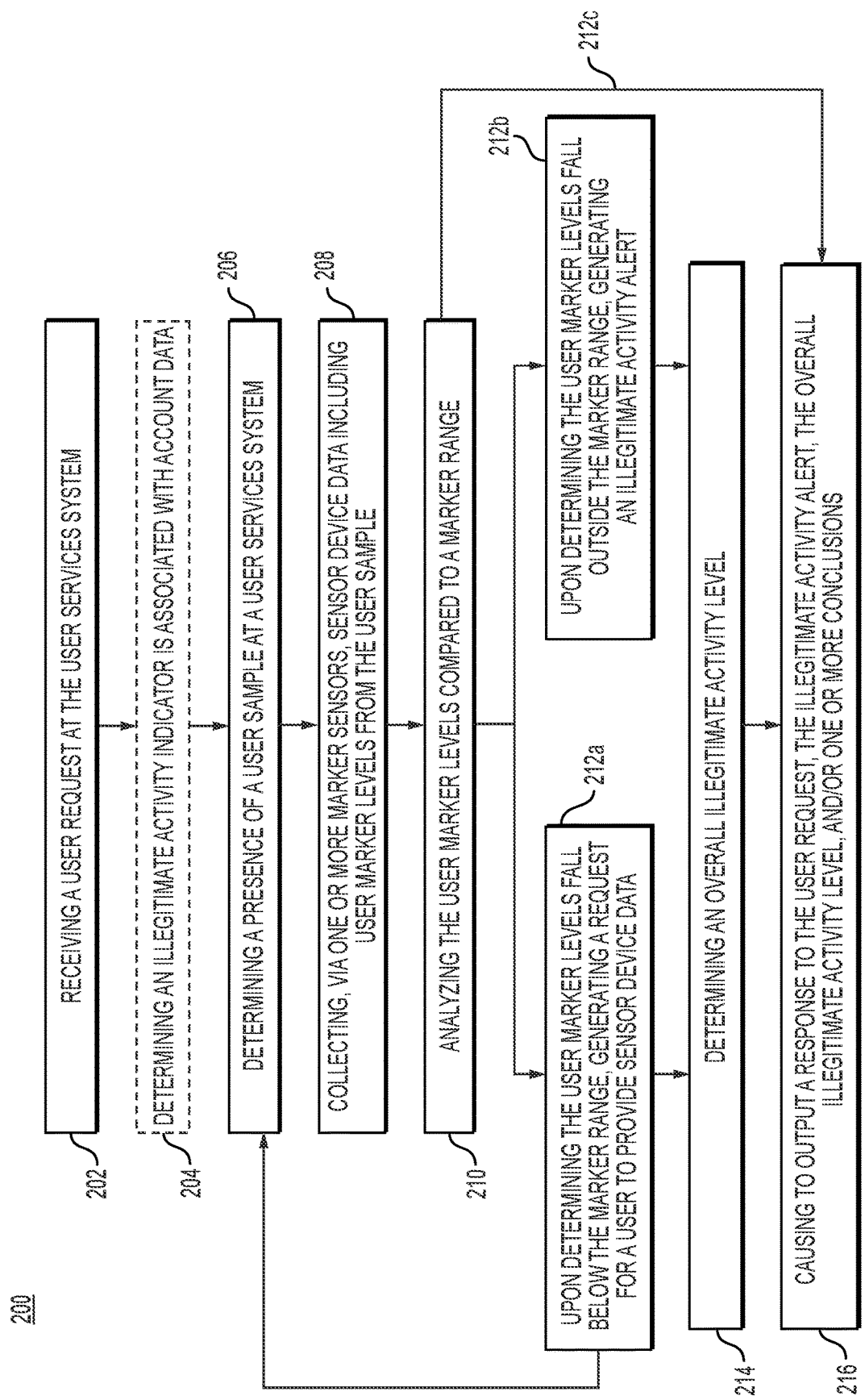
FIG. 2 depicts an exemplary method for predicting illegitimate activity based on detecting user marker levels, according to one or more embodiments.

FIG. 2 depicts an exemplary method 200 for predicting illegitimate activity based on detecting user marker levels, according to one or more embodiments. In some techniques, a user 105 may obtain access to an account holder's transaction card 110. The user 105 may attempt to illegitimately access one or more accounts, e.g., a checking account, a savings account, etc., associated with the transaction card 110 via a user services system 115, e.g., an ATM. The user 105 may interact with the transaction card 110 and/or the ATM, leaving residue on one or both of the transaction card 110 and/or the one or more aspects of the ATM, e.g., the keypad. Based on the interaction the user 105 has with the ATM, e.g., the user request, account data may be obtained.

At step 202, a user request may be received at the user services system, e.g., at an ATM. The user request may include a request for account activity, e.g., a request for a withdrawal, deposit, transfer, etc. For example, user 105 may access an account holder's account using transaction card 110 at an ATM and request a withdrawal of funds. In response to receiving the user request, account data may be received at the user services system.

Optionally, at step 204, the method may determine that an illegitimate activity indicator is associated with the account data. For example, an account holder may have reported to an account manager, e.g., a financial institution, that transaction card 110 was missing. The financial institution may note the missing status with the account data. Thus, when a user request is received in relation to the missing transaction card, the ATM may receive the illegitimate activity indicator (the missing card status) associated with the account data. In some techniques, upon determining that an illegitimate activity indicator is associated with the account data, sensor device data may be collected (see step 208).

At step 206, the method may determine the presence of a user sample at the user services system. As discussed herein, the user sample may be in the form of residue left on the transaction card and/or on one or more aspects of user services system 115, e.g., the keypad. In some techniques, the presence of one or more samples may be determined at one or more sensors. For example, the ATM may detect the presence of a sample, e.g., residue from a user's fingers, at the sensor(s) associated with the keypad and/or at the sensor(s) associated with the card slot. As discussed in more detail below, the sensor associated with each sample may be saved to a database, e.g., to database 130. For example, if the presence of a sample is determined at the sensor(s) associated with the keypad, the data collected based on the sample (see step 208) may be tagged with sensor location data, e.g., that the presence of the sample was determined at the keypad. In another example, if the presence of a sample is determined at the sensor(s) associated with the card slot, the data collected based on the sample (see step 208) may be tagged with sensor location data, e.g., that the presence of the sample was determined at the card slot.

At step 208, the one or more sensors 117, e.g., associated with the keypad, the card slot, etc., may collect sensor device data for the user sample. As discussed herein, the sensor device data collected may include the molecular composition of a user sample, e.g., sweat, oil, etc. In some techniques, the sensor device data may include a determination that the sample includes one or more biological markers, e.g., one or more neurotransmitters, hormones, neurohormones, etc. For example, the sensor device data may include a determination that the sample includes catecholamines. In some techniques, user marker levels may be determined from the sensor device data. For example, the levels of catecholamines in the sample may be determined, e.g., by one or more sensors 117, as user marker levels.

Sensor device data may be collected by one or more sensors 117 during an interaction between the user 105 and the ATM. For example, sensor device data may be collected from the sensor(s) 117 associated with the ATM keypad and/or the sensor(s) 117 associated with the ATM card slot. As discussed in more detail below (see step 210), the sensor device data collected from a first sensor may differ from the sensor device data collected from a second sensor. The differences between the sensor device data may further provide insight into possible illegitimate activity, which may increase the accuracy and reliability of the analysis.

The location of the sensor collecting the sensor device data may be noted and/or saved with the related sensor device data. For example, if first sensor device data is collected via the sensor(s) associated with the ATM GUI, e.g., GUI 116, the first sensor device data may be noted as collected via the sensor(s) associated with GUI 116. In another example, if second sensor device data is collected via the sensor(s) associated with the ATM card slot, the second sensor device data may be noted as collected via the sensor(s) associated with the card slot. The location of the sensor(s) conducting sensor device data collection—or the location of the sensor(s) determining the presence of a user sample (see step 206)—may be used in analyzing the sample and/or sensor device data (see step 210).

In some techniques, sensor device data is automatically collected upon method 200 determining an illegitimate activity indicator is associated with the account data (see step 204). For example, if an illegitimate activity indicator is determined to be associated with the data, as described in step 204, sensor device data may be automatically collected upon receiving a request at user services system 115, upon determining the presence of the user sample at user services system 115, etc.

At step 210, the user marker levels are analyzed to predict illegitimate activity. The user marker levels may be analyzed based on one or more threshold values, e.g., a marker range. The marker range may be a standardized range, an account holder-specific range, etc. The standardized range may be location-dependent, e.g., based on national and/or regional data. For example, a marker range for an account holder residing in Greece may differ from a marker range for an account holder residing in the United States. In another example, a marker range for an account holder residing in California may differ from a marker range for an account holder residing in New York. In other words, a marker range may be a geographically bound marker range.

The account holder-specific range may be a range determined for a given account holder. For example, a first account holder may naturally have a higher marker range than a second account holder, so analyzing the user marker level based on an account holder-specific range may increase the accuracy and/or reliability of the determination by avoiding false negatives and/or false positives that may be associated with a standardized range. The account holder-specific range may be established in an initialization process (e.g., one or more initial measures of the account holder's marker levels), a process over time (e.g., as the account holder uses the transaction card and/or ATM), etc. The initialization process may include collecting one or more samples from the account holder to determine an average range for the account holder. The process over time may include the account holder using the transaction card and/or an ATM one or more times to establish the account holder-specific range.

Additionally, the account holder-specific range may take into account catecholamine-related diseases and/or disorders that may affect the analysis, such as anxiety disorders, Alzheimer's disease, Multiple Sclerosis, Parkinson's disease, Huntington's chorea, certain tumors (e.g., pheochromocytoma, paraganglioma, or neuroblastoma), and/or any catecholamine-modulating medications that may also affect that results, such as albuterol, cyclobenzaprine, monoamine oxidase inhibitors (MAOIs), etc. For example, if an account holder has Huntington's chorea, their catecholamine levels may be higher on average than an individual who does not have the same disease.

The user marker levels may be determined from the one or more user samples, e.g., using one or more non-invasive biosensors, dermal microdialysis, etc. The user marker levels (determined from one or more user samples) may be compared to the marker range. In some techniques, the user marker levels obtained via the one or more sensors associated with the ATM may be compared to one or more marker ranges, e.g., a national range, a regional range, an account holder-specific range, etc.

In some techniques, the user marker levels may be analyzed by a trained machine learning model to predict the illegitimate activity. For example, a trained machine learning model may be used to predict illegitimate activity based account data, sensor location data, one or more user samples, sensor device data, one or more marker levels, one or more marker ranges, one or more illegitimate activity indicators, one or more user requests, etc. As discussed in greater detail herein, any suitable machine learning techniques may be used.

In some techniques, the user marker level(s) from more than one user sample may be compared to one or more prior user samples. For example, the method may compare a first user marker level analyzed on a first day to a second user marker level analyzed on a second day. In another example, the method may compare a first user marker level to a second user marker level, each collected at 10 AM and at 2 PM on a first day, respectively.

Comparing two or more user marker levels may be advantageous if the determined user marker levels do not significantly exceed or fall below the marker range, but illegitimate activity is nonetheless suspected. For example, a user sample may be within the account holder-specific range, but one or more illegitimate activity indicators are associated with the account. Comparing the two or more user marker levels may increase accuracy in predicting illegitimate behavior, e.g., by determining differences that may be close in time, such that it is less likely that a determined difference is due to physiological changes rather than illegitimate activity.

In some techniques, comparing the two or more user samples may be based on the location from which the user samples were collected. The location may be a location on the ATM (e.g., card slot, keypad, GUI, etc.), a location in space (e.g., a first ATM location, a second ATM location, a register, etc.). Illegitimate activity may be indicated if the marker levels associated with a first location vary from the marker levels associated with a second location. For example, a first sample collected from a sensor associated with an ATM card slot may be compared to a second sample collected from a sensor associated with an ATM keypad. If the marker levels of the first sample differ from the marker levels of the second sample, an illegitimate activity alert may be generated. This feature may be advantageous, for example, because the residue on the transaction card may be that of the account holder, whereas the residue on the keypad may be that of the user, e.g., illegitimate user. Therefore, even if the first sample and the second sample have marker levels that fall within the marker range, a difference in the two marker levels may indicate the presence of illegitimate activity.

At step 212a, if the user marker levels fall below the marker range, a request for the user to provide data (e.g., sensor device data, authentication data, etc.) may be generated. For example, if a user is wearing gloves, a user sample may not be detected (see step 206) and/or collected (see step 208). Thus, the determined user marker levels may fall below the marker range, and a request, e.g., a request to provide a user sample, may be generated. In another example, if a first user sample is collected and determined to fall below the marker range, a request to provide a second user sample may be generated.

At step 212b, if the user marker levels fall outside (e.g., above an upper threshold or below a lower threshold) the marker range, an illegitimate activity alert may be generated. In some techniques, if the user marker levels fall below the marker range, e.g., fall below the lower threshold, an illegitimate activity alert may be generated. For example, if the presence of a user sample is detected (see step 206) and the user marker levels are determined to fall below the marker range, an illegitimate activity alert may be generated. In another example, if the user provides a user sample in response to a first determination that the user marker levels fall below the marker range (as described above in step 212a), an illegitimate activity alert may be generated in response to a second determination that the user marker levels fall below the marker range. In some techniques, if the user marker levels exceed the marker range, e.g., exceed the upper threshold, an illegitimate activity alert may be generated.

At step 212c, if the user marker levels are predicted not to be indicative of illegitimate activity, one or more conclusions (e.g., one or more risk factors) may be determined based on the user marker levels. In some techniques, the user sample may be analyzed by a trained machine learning model, e.g., the trained risk factor machine learning model, to predict the one or more risk factors. For example, the trained risk factor machine learning model may be used to predict the one or more risk factors based on the user sample, risk factor data, etc. As discussed in greater detail herein, any suitable machine learning techniques may be used.

As discussed above, if one or more conclusions (e.g., risk factors) are determined, they may be caused to be output (see step 216), e.g., via a GUI. If the user marker levels are within the marker range (e.g., do not fall outside the marker range), the user marker levels may be predicted not to be indicative of illegitimate activity.

At step 214, an overall illegitimate activity level may be determined. As discussed herein, the overall illegitimate activity level may be determined based on one or more of the one or more user samples, the user marker levels, the one or more illegitimate activity indicators, the illegitimate activity alert, and/or other data (e.g., account transaction history).

In some techniques, a trained machine learning model may be trained to predict the overall illegitimate activity level. For example, a trained machine learning model may be used to predict overall illegitimate activity associated with an account based on one or more of the one or more user samples, the user marker levels, the one or more illegitimate activity indicators, the illegitimate activity alert, other data (e.g., account transaction history), etc. As discussed in greater detail herein, any suitable machine learning techniques may be used.

At step 216, the system hosting the illegitimate activity prediction system may be configured to output and/or to cause to output the illegitimate activity alert, the overall illegitimate activity level, a response to the user's request, and/or one or more conclusions (e.g., one or more risk factors) to a recipient system. The response to the user's request may include one or more of a rejection, an acceptance, a hold, a request for the user to provide a user sample, a status of the account, etc. The hosting system may be configured to output and/or cause to output the illegitimate activity alert, the overall illegitimate activity alert, and/or the response to the user's request to one or more GUI, e.g., GUI 116, a GUI associated with AH device 125, etc. For example, if the user requested a withdrawal from the account and the method predicted illegitimate activity associated with the request, a notification of rejection of the request may be caused to be output via GUI 116 and one or both of the illegitimate activity alert and/or the overall illegitimate activity alert may be caused to be output via AH device 125.

In some techniques, the one or more risk factors may be output to one or more GUIs, e.g., GUI 116, a GUI associated with AH device 125, a GUI associated with a health provider's device, etc. For example, if a risk factor for progression of Parkinson's disease is determined, the determined risk factor may be caused to be output to AH device 125, to a device of the medical provider of the account holder, etc. In some techniques, the one or more risk factors may be transmitted to a trend analysis module, e.g., marker analysis system 119. The marker analysis system 119 may determine one or more trends based on one or more of the user samples, the one or more risk factors, risk factor data, etc. The one or more trends may be determined on an ongoing basis, e.g., routinely, when a user sample is collected, etc. The one or more determined trends may be caused to be output to AH device 125, to a device of the medical provider of the account holder, etc.

Figure 3:
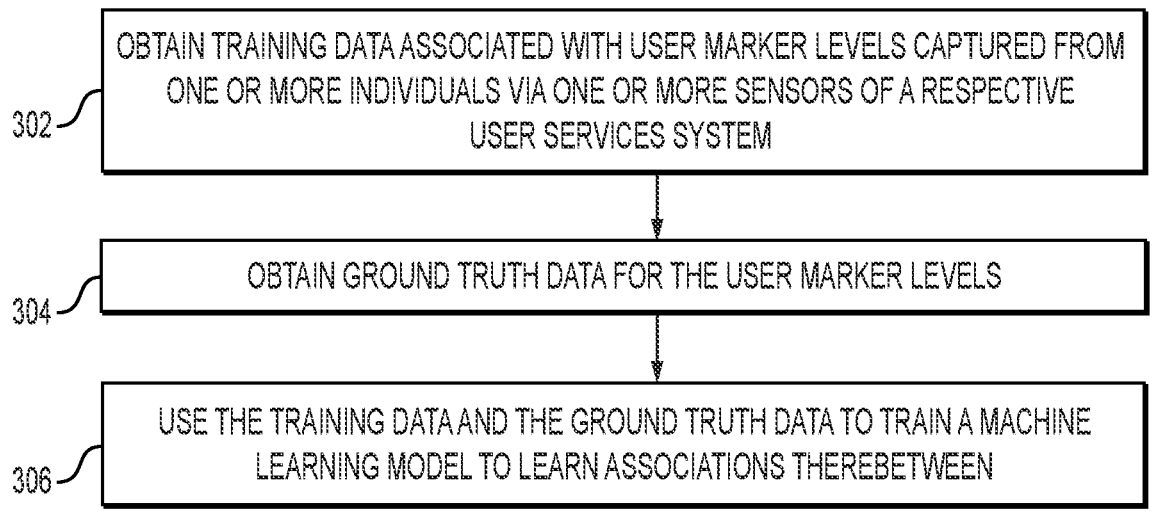
FIG. 3 depicts an exemplary method for training a machine learning model to predict illegitimate activity based on user marker levels, according to one or more embodiments.

FIG. 3 depicts an exemplary method 300 for training a machine learning model to predict illegitimate activity based on user marker levels. At step 302, the machine learning model associated with marker analysis system 119 may obtain training data associated with one or more individuals, e.g., user marker levels. The training data may include one or more user marker levels, e.g., catecholamine levels. In some embodiments, the training data includes one or more comparisons of the user marker levels, e.g., comparing epinephrine levels to norepinephrine levels, comparing morning catecholamine levels to afternoon catecholamine levels for an individual, etc. In some embodiments, the training data may further include other data for the one or more individuals, e.g., underlying medical conditions, administered medications, etc.

At step 304, the machine learning model associated with marker analysis system 119 may obtain ground truth data for the one or more individuals. Such ground truth data may include, for example, one or more assessments associated with the one or more individuals' user marker levels and/or one or more illegitimate activity alerts or the like. In some embodiments, such ground truth data may be in the form of outcome data that, for example, coincides with a determination of illegitimate activity. In some embodiments, various portions of one or more of the training data or the ground truth data may be obtained, for example, from sensor device data from one or more individuals, user marker data from one or more individuals, databases, e.g., database 130, or the like.

At step 306, the machine learning model associated with marker analysis system 119 may use the training data and the ground truth data to train a machine learning model to learn associations. Such associations may, for example, be between the user marker levels of the one or more individuals and the one or more illegitimate activity prediction for an account, or any suitable modification, combination, or subdivision of the foregoing.

Figure 4:
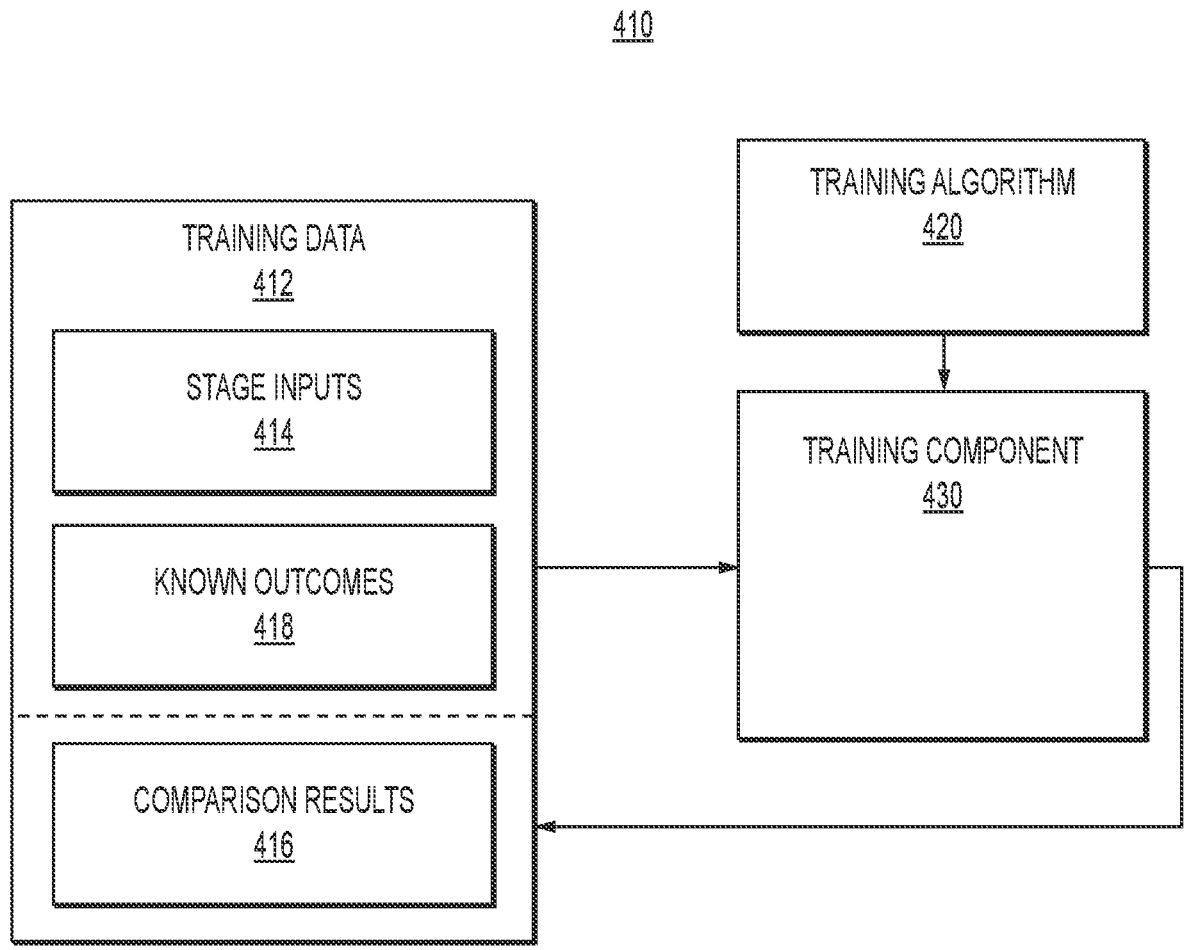
FIG. 4 depicts an exemplary schematic for training a machine learning model to predict illegitimate activity based on user marker levels, according to one or more embodiments.

One or more implementations disclosed herein include and/or are implemented using a machine learning model, e.g., one or more of marker analysis system 119, IAA system 120, etc., are implemented using a machine learning model and/or are used to train the machine learning model. A given machine learning model may be trained using the training flow chart 410 of FIG. 4. The training data 412 may include one or more of stage inputs 414 and the known outcomes 418 related to the machine learning model to be trained. The stage inputs 414 are from any applicable source including text, visual representations, data, values, comparisons, and stage outputs, e.g., one or more outputs from one or more steps from FIG. 2-3. The known outcomes 418 are included for the machine learning models generated based on supervised or semi-supervised training. An unsupervised machine learning model is not trained using the known outcomes 418. The known outcomes 418 includes known or desired outputs for future inputs similar to or in the same category as the stage inputs 414 that do not have corresponding known outputs.

The training data 412 and a training algorithm 420, e.g., one or more of the modules implemented using the machine learning model and/or are used to train the machine learning model, is provided to a training component 430 that applies the training data 412 to the training algorithm 420 to generate the machine learning model. According to an implementation, the training component 430 is provided with comparison results 416 that compare a previous output of the corresponding machine learning model to apply the previous result to re-train the machine learning model. The comparison results 416 are used by the training component 430 to update the corresponding machine learning model. The training algorithm 420 utilizes machine learning networks and/or models including, but not limited to a deep learning network such as a transformer, Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, the model specifically discussed herein, or the like.

The machine learning model used herein is trained and/or used by adjusting one or more weights and/or one or more layers of the machine learning model. For example, during training, a given weight is adjusted (e.g., increased, decreased, removed) based on training data or input data. Similarly, a layer is updated, added, or removed based on training data/and or input data. The resulting outputs are adjusted based on the adjusted weights and/or layers.

Figure 5:
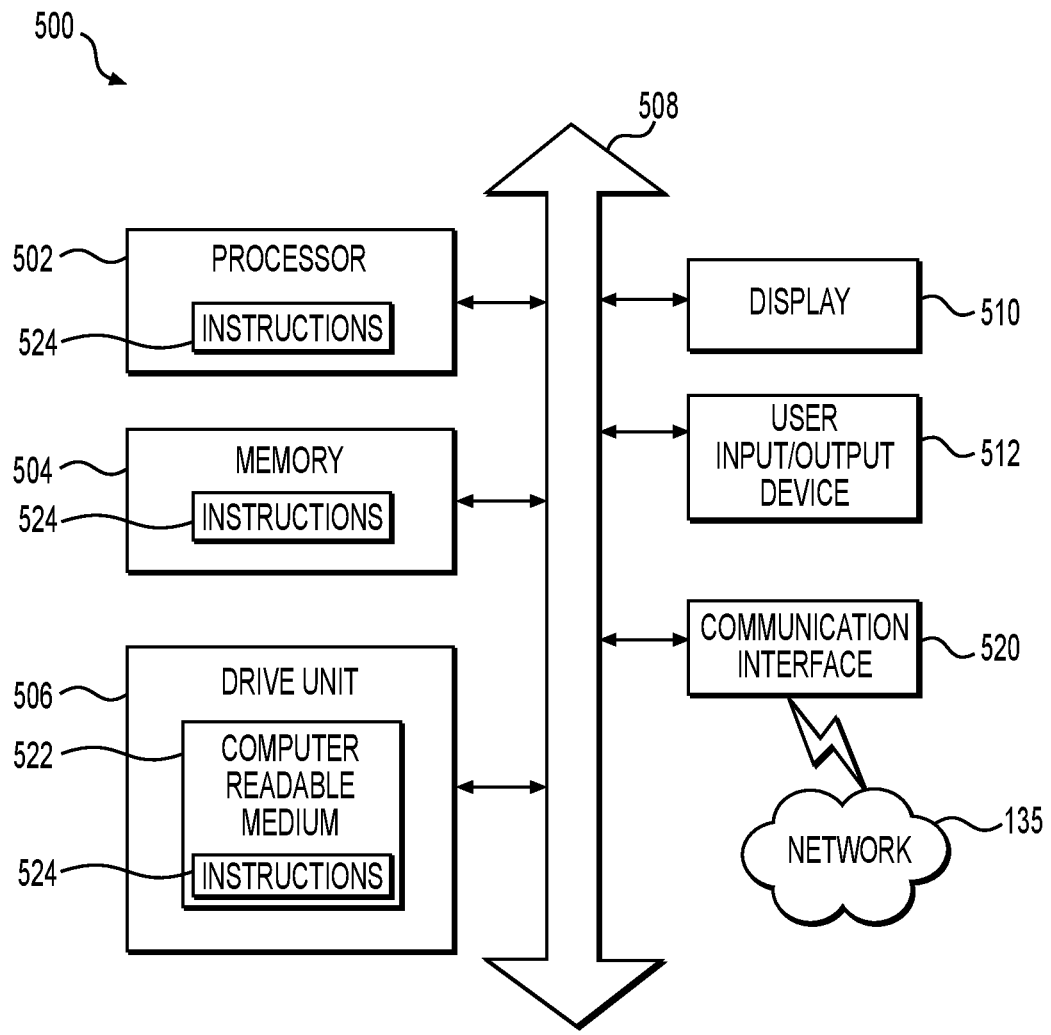
FIG. 5 depicts a simplified functional block diagram of a computer, according to one or more embodiments.

FIG. 5 depicts a simplified functional block diagram of a computer 500 that may be configured as a device for executing the methods disclosed here, according to exemplary embodiments of the present disclosure. For example, the computer 500 may be configured as a system according to exemplary embodiments of this disclosure. In various embodiments, any of the systems herein may be a computer 500 including, for example, a data communication interface 520 for packet data communication. The computer 500 also may include a central processing unit (CPU) 502, in the form of one or more processors, for executing program instructions. The computer 500 may include an internal communication bus 508, and a storage unit 506 (such as ROM, HDD, SDD, etc.) that may store data on a computer readable medium 522, although the computer 500 may receive programming and data via network communications. The computer 500 may also have a memory 504 (such as RAM) storing instructions 524 for executing techniques presented herein, although the instructions 524 may be stored temporarily or permanently within other modules of computer 500 (e.g., processor 502 and/or computer readable medium 522). The computer 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for predicting illegitimate transaction activity based on detecting user marker levels, the method comprising:
receiving, by a user services system, an identification card comprising a reservoir wherein the reservoir includes a user sample from a user;
determining, by one or more marker sensors of the user services system, a presence of the user sample at the user services system;
collecting, via the one or more marker sensors, sensor device data, the sensor device data including user marker levels from the user sample;
analyzing, via a machine learning model, the user marker levels, wherein the machine learning model has been trained to associate catecholamine levels and epinephrine levels with illegitimate activity to determine a marker range for the user; and upon determining, by the machine learning model, the user marker levels are above the marker range, automatically rejecting a transaction request of the user and generating and transmitting an illegitimate activity alert to a user device, or upon determining the user marker levels are below the marker range, automatically generating a request for an additional user sample or an input of additional authentication data.

2. The method of claim 1, wherein collecting the sensor device data further comprises:

receiving, via one or more further marker sensors, the presence of the user sample on a touch screen of the user services system; and collecting, via the one or more further marker sensors, further sensor device data from the user sample on the touch screen including user marker levels from the user sample.

3. The method of claim 1, wherein collecting the sensor device data further comprises:

receiving, via one or more further marker sensors, the presence of the user sample on a keyboard of the user services system; and collecting, via one or more further marker sensors, further sensor device data from the user sample on the keyboard.

4. The method of claim 1, further comprising:

receiving, via the user services system, account data;

determining an illegitimate activity indicator is associated with the account data; and automatically collecting sensor device data via the one or more marker sensors based on the determining the illegitimate activity indicator is associated with the account data.

5. The method of claim 1, further comprising:

upon determining the presence of the user sample, automatically collecting the sensor device data.

6. The method of claim 1, further comprising:

determining the user services system is activated;

determining, via the one or more marker sensors, the user marker levels are below the marker range based on a threshold;

generating a request for a user to provide sensor device data; and causing to output the request via a user interface.

7. The method of claim 1, further comprising:

determining, via a trained machine learning model, whether the user marker levels fall outside of an account holder-specific marker range, the trained machine learning model trained to predict illegitimate activity based on the user marker levels present in the user sample; and upon determining the user marker levels fall outside the account holder-specific marker range, generating an illegitimate activity alert.

8. The method of claim 7, further comprising:

generating the account holder-specific marker range based on account holder-specific data.

9. The method of claim 8, further comprising:

collecting the account holder-specific data from one or more accounts associated with an account holder.

10. The method of claim 1, further comprising:

determining an overall illegitimate activity level, the overall illegitimate activity level determined based on the illegitimate activity alert to the user device and one or more other illegitimate activity indicators; and outputting the overall illegitimate activity level to a database system.

11. The method of claim 1, further comprising:

receiving a user request at the user services system, the user request including a request for account activity;

upon determining the user marker levels exceed the marker range, rejecting the user request; and causing to output a notification of the rejection of the user request via a user interface of the user services system.

12. A method for predicting illegitimate activity based on detecting user marker levels, the method comprising:

receiving a user request at a user services system, the user request including a request by a user to complete a transaction;

determining a presence of a user sample by one or more marker sensors of the user services system;

automatically collecting, via the one or more marker sensors, sensor device data, the sensor device data including user marker levels from the user sample;

determining, via a trained machine learning model, a prediction of illegitimate activity by the user based on whether the user marker levels are outside of an account holder-specific marker range, wherein the account holder-specific marker range is generated based on account holder-specific data collected from one or more accounts, the trained machine learning model trained to predict illegitimate activity for the user based on catecholamine levels and epinephrine levels of the collected user marker levels present in the user sample and the account holder-specific data; and upon determining the user marker levels are outside of the account holder-specific marker range and illegitimate, automatically rejecting the request of the user and generating an illegitimate activity alert and rejecting the user request and causing to output a notification of the rejection of the user request via a user interface; or upon determining the user marker levels are within the marker range and legitimate, accepting the user request and processing a transaction.

13. The method of claim 12, wherein the determining the presence of a user sample further comprises:

determining, via one or more further marker sensors, the presence of the user sample from an account card received by the user services system; and collecting, via the one or more further marker sensors, further sensor device data from the account card, the further sensor device data including additional user marker levels from the account card.

14. The method of claim 12, wherein the determining the presence of a user sample further comprises:

determining the presence of the user sample from one or more of a user's fingers at the one or more marker sensors.

15. The method of claim 12, further comprising:

receiving, via the user services system, account data;

determining an illegitimate activity indicator is associated with the account data; and automatically collecting sensor device data via the one or more marker sensors based on the determining the illegitimate activity indicator is associated with the account data.

16. The method of claim 12, further comprising:

upon determining the presence of the user sample, automatically collecting the sensor device data from a touch screen.

17. The method of claim 12, further comprising:
determining the user services system is activated;
determining, via the one or more marker sensors, the user marker levels are below the account holder-specific marker range based on a threshold;
generating a request for a user to provide sensor device data; and
causing to output the request via a user interface.

18. The method of claim 12, further comprising:
determining an overall illegitimate activity level, the overall illegitimate activity level determined based on the illegitimate activity alert to the user device and one or more other illegitimate activity indicators; and
outputting the overall illegitimate activity level to a database system.

19. The method of claim 12, further comprising:
receiving a user request at the user services system, the user request including a request for account activity;
upon determining the user marker levels exceed the account holder-specific marker range, rejecting the user request; and
causing to output a notification of the rejection of the user request via a user interface of the user services system.

20. An automated teller machine (ATM) system, the system comprising:
a residue sensor;
at least one memory storing instructions; and
at least one processor executing the instructions to perform operations for predicting illegitimate activity based on detecting user marker levels, the operations including:
   determining, by the residue sensor, a presence of a user sample at the automated teller machine;
   collecting, via the residue sensor, sensor device data, the sensor device data including user marker levels from the user sample;
   analyzing, via a machine learning model, the user marker levels, wherein the machine learning model has been trained to associate catecholamine levels and epinephrine levels with illegitimate activity to determine a marker range for the user; and
   upon determining the user marker levels are outside of the marker range and illegitimate, automatically rejecting a transaction request of the user and generating an illegitimate activity alert, or
upon determining the user marker levels are within the marker range and legitimate, accepting the user transaction request.

* * * * *